Jan. 31, 1961 R. B. STEPHENS 2,969,588
TOOL FOR INSERTING WIRE COILS IN BORES
Filed July 8, 1958 4 Sheets-Sheet 1
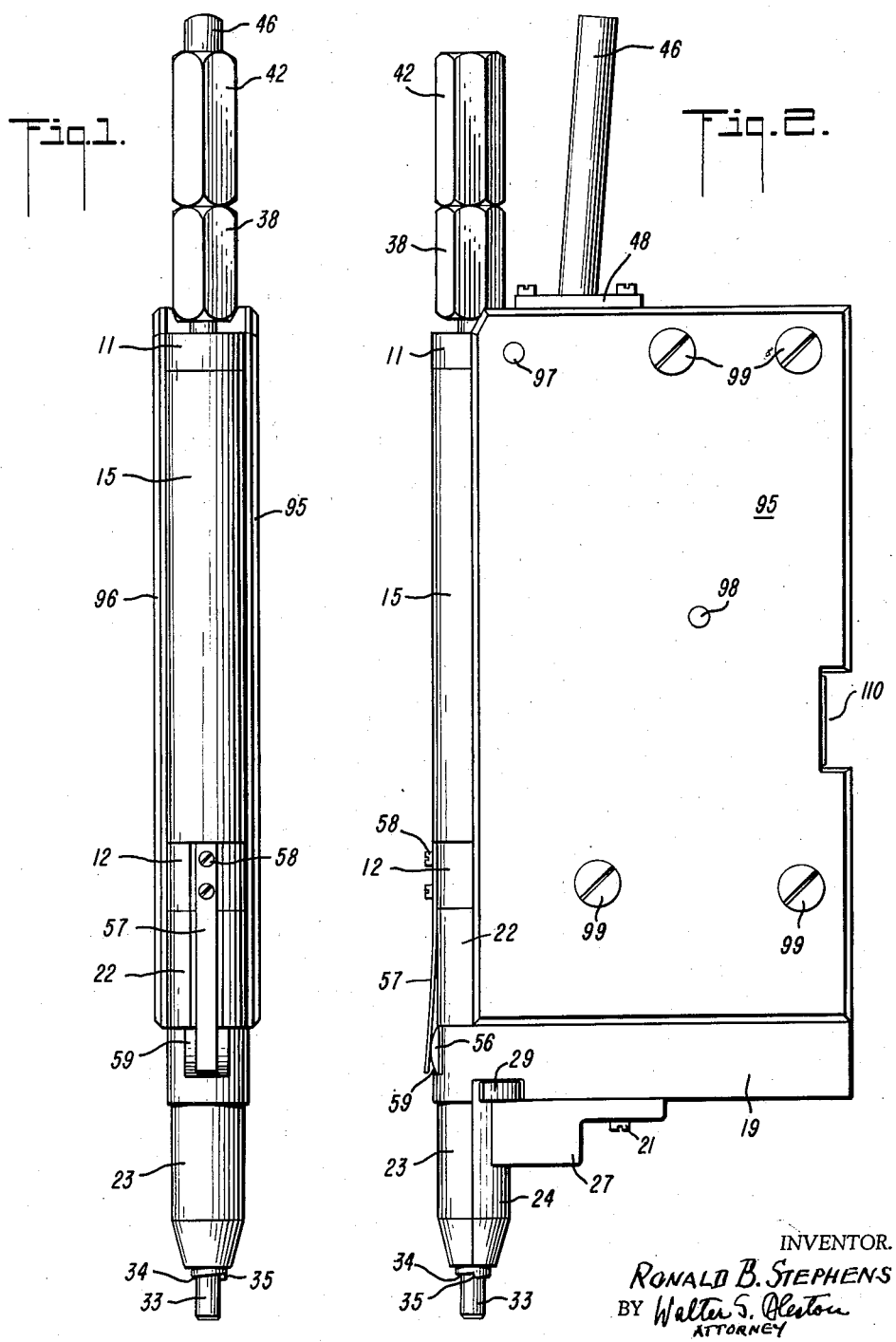
INVENTOR.
RONALD B. STEPHENS
BY Walter S. Pleston
ATTORNEY Jan. 31, 1961  R. B. STEPHENS  2,969,588
TOOL FOR INSERTING WIRE COILS IN BORES
Filed July 8, 1958  4 Sheets-Sheet 2
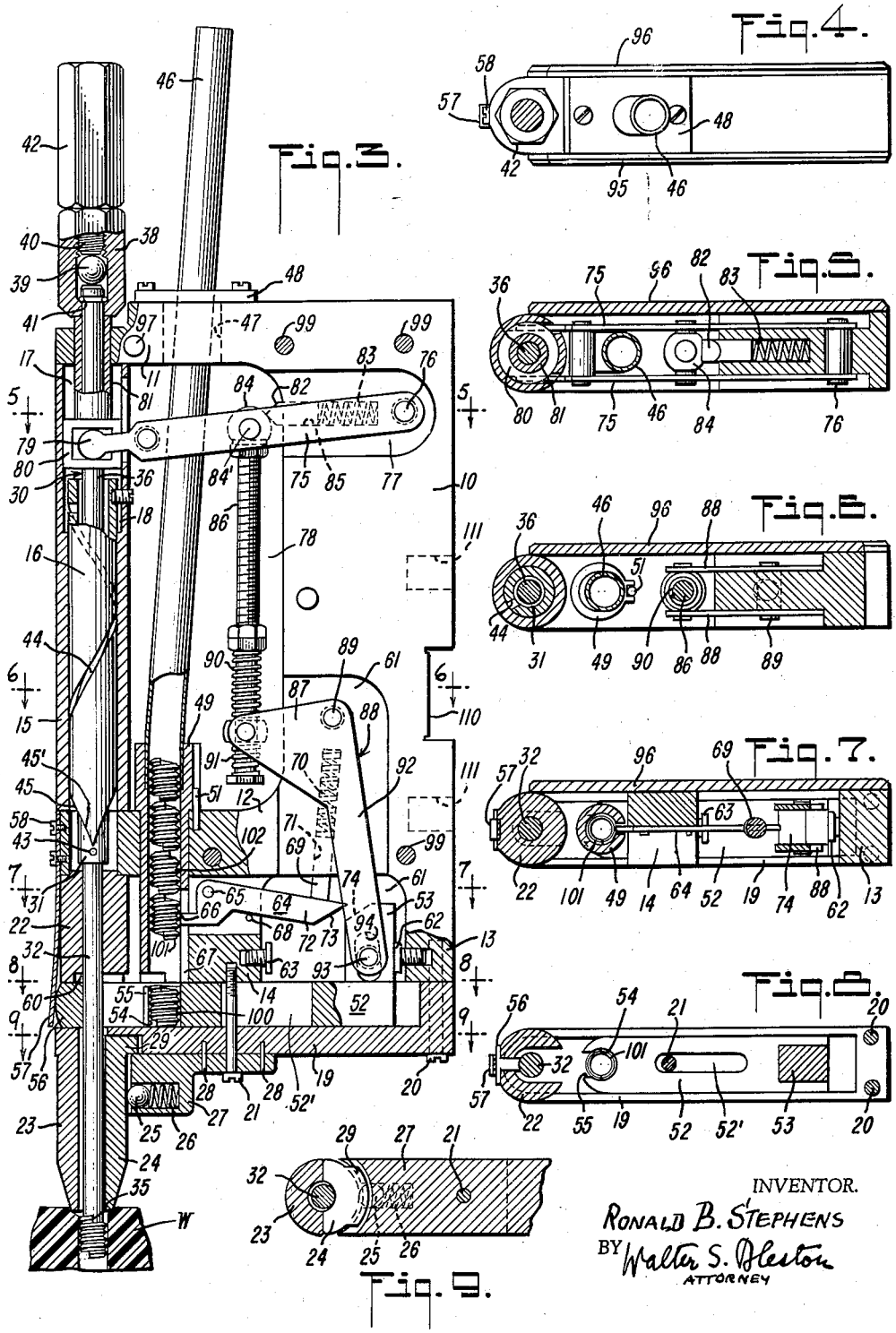
INVENTOR.
RONALD B. STEPHENS
BY Walter S. Heston
ATTORNEY

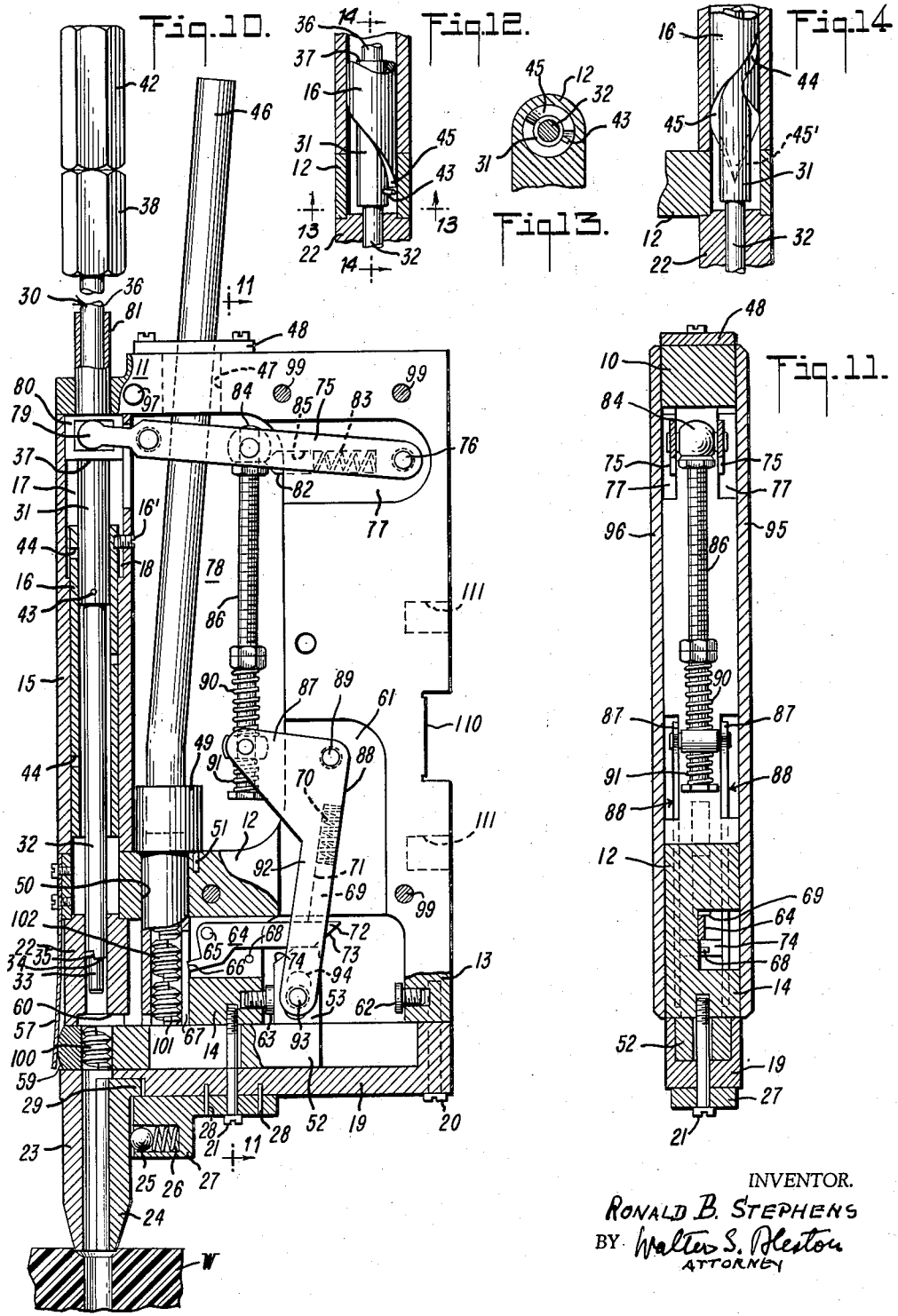

Jan. 31, 1961  R. B. STEPHENS  2,969,588
TOOL FOR INSERTING WIRE COILS IN BORES
Filed July 8, 1958  4 Sheets-Sheet 4
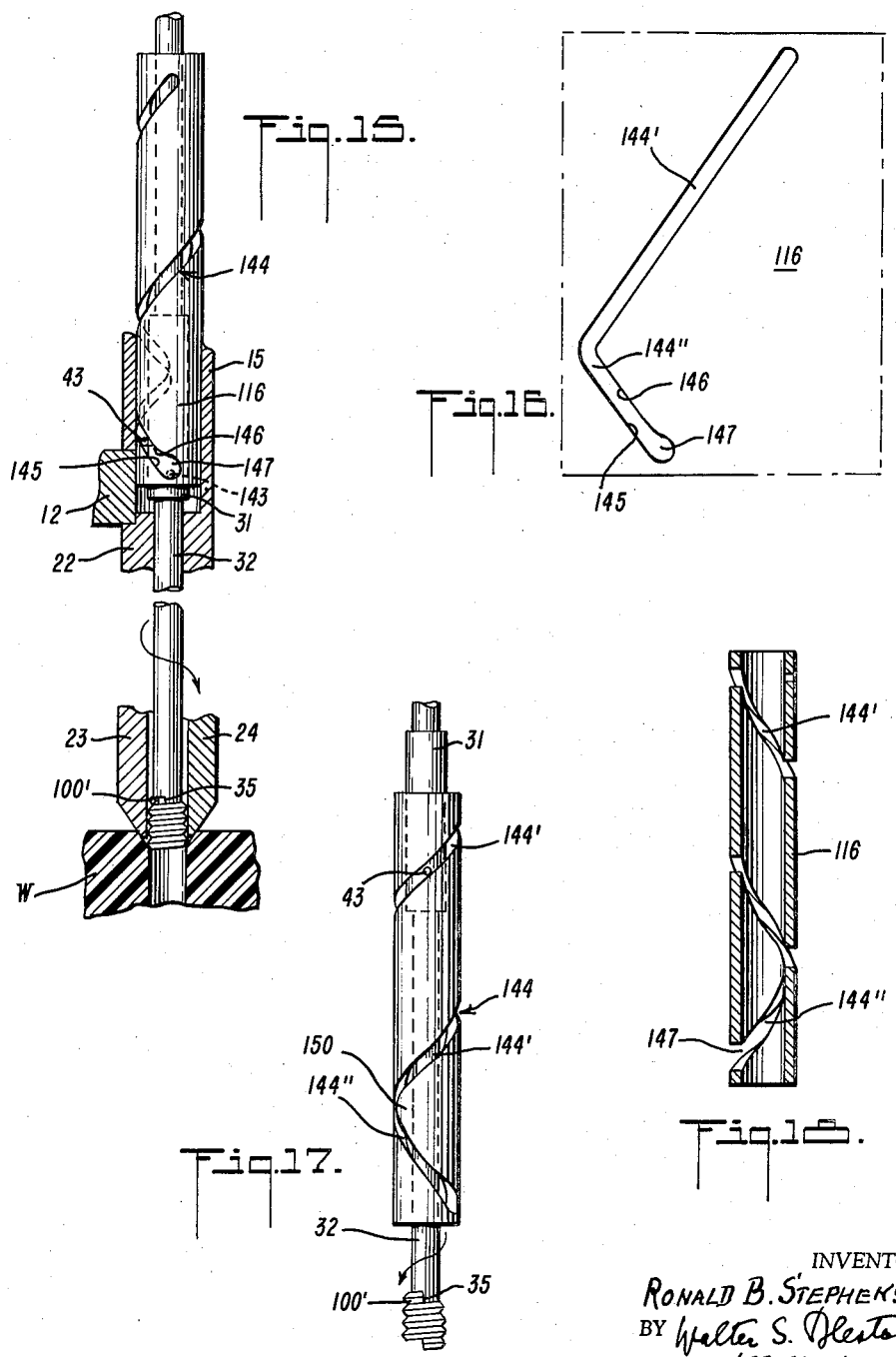
INVENTOR.
RONALD B. STEPHENS
BY Walter S. Pleston
ATTORNEY

United States Patent Office 2,969,588
Patented Jan. 31, 1961

2,969,588

TOOL FOR INSERTING WIRE COILS IN BORES

Ronald B. Stephens, York, England, assignor to Heli Coil Corporation, Danbury, Conn., a corporation of Delaware Filed July 8, 1958, Ser. No. 747,215

7 Claims. (Cl. 29—240.5)

The present invention relates to the introduction of wire coil screw thread forming inserts into cylindrical bores in work pieces by pushing them in. Such so-called push type inserts are, prior to their introduction, of slightly greater external diameter than the bore diameter and when introduced remain engaged in the work piece bore thereby presenting a screw thread therein.

An object of the invention is to provide a tool for mechanically introducing these push type inserts into the work piece.

Another object of the invention is to provide for the mentioned purpose a tool which comprises a power operative reciprocal mandrel adapted to displace an insert through a guide nozzle, said mandrel having a helical shoulder complementary to an end of the insert so as to be adapted properly to bear at that insert end.

The invention also aims to provide guiding means for rotating the mandrel positively during the major portion of its displacement to ensure complete engagement of the helical shoulder with the end convolution of the insert, and to release the mandrel from constraint rotation during the end portion of its operative stroke.

In another form of the invention, an object is to cause engagement of a step of the helical mandrel shoulder with the end of the insert by a positive rotation of the mandrel in the one direction through the major portion of its displacement, and to reverse the positive rotation of the mandrel towards the end of its displacement thereby to cause a torque tending to contract the insert.

The invention further aims to provide a mechanism for feeding inserts to the mandrel corresponding to and in synchronism with the reciprocal mandrel movement.

Further objects and details of the invention will be apparent from the following description and the accompanying drawing illustrating an embodiment thereof by way of example.

In the drawings:

Figs. 1 and 2 are front and side elevations, respectively, of the tool,

Fig. 3 is a side elevation partly in section, a cover plate being removed, and the mandrel being in its lowermost position, the introduction of an insert having been completed, Fig. 4 is a top plan view, Figs. 5, 6, 7 and 8 are cross-sections along lines 5—5, 6—6, 7—7 and 8—8, respectively, of Fig. 3; in Figs. 5, 6 and 7 one cover plate, and in Fig. 8 both cover plates being removed, Fig. 9 is a partial cross-section along line 9—9 in Fig. 3, Fig. 10 is a side elevation similar to Fig. 3 with the mandrel in its uppermost position, Fig. 11 is a section along line 11—11 of Fig. 10, Fig. 12 is a partial view in section showing the guided mandrel portion in the position in which the mandrel is freely rotatable, Figs. 13 and 14 are cross-sections along lines 13—13 and 14—14, respectively, in Fig. 12, Fig. 15 is a view similar to Fig. 14 of a modification with a scroll of a different shape for turning the mandrel, parts of the adjoining members being shown, Fig. 16 is a development of a portion of the member provided with the scroll of Fig. 15, Fig. 17 is an elevation of the scroll-provided member with the mandrel in a position engaging an insert, and Fig. 18 is a longitudinal cross-section of the member of Fig. 17.

Referring now to the drawing, the illustrated tool comprises an upright body or frame plate 10 of substantial thickness from which two parallel spaced arms 11 and 12 extend forwards and two extensions 13 and 14 project downwardly, as visible in Figs. 3 and 10. A tubular member 15 is inserted between the arms 11 and 12 and secured to their forward ends by means not shown. A tubular sleeve 16 is inserted from below through an opening in the lower body arm 12 and extends upwards fittingly through the major length of the tube 15 so, however, that it leaves a clear space 17 in the upper end of the tube 15 which may be somewhat widened in that portion, as clearly seen at 18. Sleeve 16 is secured in member 15 by means such as screws 16'. To the lower end face of the extensions 13 and 14, a bottom piece 19 is secured by screws 20 and 21 engaging in the body extensions 13 and 14, respectively. Piece 19 has an upward tubular extension 22 which forms the lower continuation of sleeve 16, and also a co-axial downward extension 23, which, however, is only semi-cylindrical, as clearly shown in Fig. 9. A complementing piece 24 of slightly less than semi-circular cross-section is urged against the portion 23 by a ball 25 biased by a spring 26 and located with the latter in a little housing 27 which is secured to the bottom piece 19 by means of locating pins 28 and the aforementioned screw 21. In order to prevent piece 24 from dropping down, it is provided with an upper flange-like portion 29 bearing in a recess of piece 19 on the forward end of the housing 27. The extension 23 and the piece 24 which are tapered at their lower ends so as to fit a top end flare of a hole of a work piece indicated at W into which an insert is to be installed, constitute a nozzle-like element for a purpose to be explained later.

A mandrel, in general denoted by 30, is provided within the sleeve 16 and projects in its lowermost position shown in Fig. 3, below the nozzle 23, 24 and above the body arm 11. The mandrel has a median portion 31 which fits slidingly the interior of the sleeve 16. In its portion 32 below the median portion, the mandrel has a diameter slightly smaller than the outer diameter of the wire coil insert for which the tool is destined. The portion 32 fits the tubular extension 22 and is guided therein but should have so much clearance in the nozzle that an insert can be passed through the latter. The diameter of the lowermost projecting end 33 of the mandrel is of a very little smaller size than the inner diameter of the insert because the insert may be somewhat contracted when passing through the nozzle. Between the portions 32 and 33, shown in Fig. 10, the mandrel forms a helical shoulder 34 with a step 35 so that the end surface of an insert encompassing the end portion 33 can properly engage this shoulder throughout its length when the ultimate end of the insert bears against the step 35, as shown in Fig. 3. The upper mandrel portion 36 has a smaller diameter than portion 31 so that another shoulder 37 is formed. The upper end of the mandrel extends into a housing 38 within which a ball 39 forms a thrust bearing between the mandrel and a plug 40 screwed into the top portion of the housing. Another bearing is provided between the upper mandrel end and the housing 38. In the illustrated embodiment, this bearing is formed by a spring ring 41. The ring 41 engaging in a groove of the mandrel and bearing on a lower inner flange of the housing prevents a withdrawal of the mandrel. Plug 40 may be integral with or secured to a member 42, suitably formed to be attached to the spindle of a press which may be used for operating the device.

When an insert is presented to the mandrel in a manner to be described later and the mandrel end 33 engages in the interior of the insert, such as shown at 100 in Fig. 10, it cannot be expected that the insert end properly engages the helical shoulder 34 and the step 35 immediately. Means are therefore provided to ensure a proper relative position of the insert and the mandrel. In the illustrated embodiment, such means comprise a little pin 43 radially projecting from the median mandrel portion 31 and engaging in a scroll-like groove or slot 44 in the sleeve 16, which appears in Fig. 3. This groove or slot turns in the same direction as the insert is wound. It has been found advisable to provide means to disengage the step 35 from the ultimate insert end when the insert is fully inserted, without causing any further positive rotation of the mandrel. For this purpose, the groove 44 in the embodiment of Figs. 1 to 14 is shorter in its axial direction than the stroke of the mandrel and is widened at its lower end in an approximately reversed funnel-shaped recess 45 where the sleeve tapers out in a pointed end 45', as shown in Figs. 3 and 12 to 14 so that the flanks of the pointed end are continued by the flanks of the groove. Thus, it will be clear that if the mandrel is pushed down from the position in Fig. 10 to the position of Fig. 3, the pin 43 engaging the scroll groove 44 will cause a rotation of the mandrel at least one whole turn. The rotation of the mandrel which is made possible by the thrust bearing ball 39, will cause the end of the insert to bear against the step 35. When the mandrel continues its downward movement, the pin 43 will enter the recess 45 in the lowermost portion of which the pin 43 will discontinue to rotate the mandrel positively. Thus, the mandrel will be free to turn slightly backwards should the resiliency of the insert bearing against the step 35 cause such movement.

Means are provided to charge inserts, one at a time, to the tool so as to be engaged by the mandrel. Such means being operative in response to the mandrel movement. For this purpose, a chute is provided comprising a tube 46 extending through the whole 47 in the body arm 11 and being secured thereto by a flange 48. The lower end of the tube 46 is inserted in a sleeve 49 which is installed in a bore 50 of the lower body leg 12. The sleeve 49 is fixed in position by a pin 51 engaging the leg 12, and ends a short distance above a carriage member 52. This allows inserts to be used which are slightly larger in length than the thickness of the carriage. If the sleeve 49 is extended downwards as far as the top surface of the carriage, inserts may be used which are as large as or smaller than the thickness of the carriage. The carriage 52 is guided in the bottom piece 19 so as to be movable in a direction at right angles to the mandrel. It is longitudinally slotted at 52' so that the screw 21 can pass through it without interfering with the carriage movement. At its rear end, the carriage has an upward extension 53 to which the carriage drive described hereinafter is attached. At its front end, the carriage is provided with a part-cylindrical, vertical bore 54 of a diameter equal to the outer diameter of an insert, which means, also equal to the inner diameter of the tube 46 and sleeve 49. In the front of the carriage 52 the bore 54 has an opening 55 of a width equal to or very slightly larger than the diameter of the mandrel portion 32. Opposite the carriage 52, the bottom piece 19 is provided with a recess 60 so that on the one side the carriage 52 can enter to bring the bore 54 into coaxiality with the mandrel whereas from the front side a T-shaped plug 56 slidably projects towards the carriage 52. Plug 56 is urged towards the carriage by means of a leaf spring 57 secured to the front end of the leg 12 by means of screws 58. The inward end of the plug 56 has a face curved according to the outer diameter of the insert 100 so as to bear against the latter and to hold it frictionally in the position of Fig. 10. It will be noted that the recess 60 reaches as high as the lower edge of the chute sleeve 49 to allow the use of inserts of a corresponding length. The lower portion of the body 10, between the legs 13 and 14, is provided with a recess 61 in which the extension 53 of the carriage 52 is movable. Two screws 62 and 63 project with their heads into the recesses 61 from opposite sides and form adjustable abutments for the carriage extension 53, so that the carriage has one retracted end position in which the bore 54 is in registry with the chute sleeve 49 and a protracted end position in which the bore is in registry with the mandrel portion 32.

Means are provided to retain inserts in the chute while the lowermost insert has entered the carriage bore 54 to be protracted by the carriage 52 underneath the mandrel, as in Fig. 10. In the illustrated embodiment, such means comprises a lever 64 pivoted in the body at 65 and constituting a gate. Lever 64 has an arm 66 engageable in a slot 67 of the chute sleeve 49. In the engaging position, which is limited by a pin 68, arm 66 presses against the adjacent insert 101 in Fig. 3 to prevent it and any column of inserts above it from sliding downwards. The other arm of the lever 64 is urged towards the limiting pin 68 by a pin 69 urged downwards by a spring 70, both pin 69 and spring 70 being located in a bore 71 of the body 10. The arm 72 of lever 64 has an inclined end face 73 for co-operation with an inclined face 74 of the carriage projection 53. Thus, it will be clear that upon a forward movement of the carriage 52 the inclined surface 74 sliding against the lever end face 73 will raise the arm 72 so that the lever arm 66 will release the lowermost insert in the sleeve 49 to slide down and, as insert 101 in Fig. 10, to bear on the body of the carriage 52 until the latter has been retracted again far enough so that this insert may drop into the bore 54 while simultaneously lever arm 72 will be released from the surface 74 so that the arm 66 under the action of the spring 70 will bear against the now lowermost insert 102 in the chute sleeve 49.

Means are provided to reciprocate the carriage 52 in timed relation to the mandrel movement. For this purpose, two parallel lever arms 75 are pivoted on a pin 76 secured in the body 10. The lever arms are movable in relatively shallow recesses 77 which open in the space 78 between body 10 and its legs 11 and 12. The lever formed by the arms 75 extends forward with rounded head ends 79 sideways of the mandrel portion 36, tube 15 being suitably recessed so as to permit the passage of the lever arms. Lever heads 79 engage in openings of the head 80 of a short sleeve 81 which surrounds and guides the upper part of the mandrel portion 36 within the space 17. Sleeve 81 extends slidingly upwards through an opening in leg 11 of body 10. The sleeve 81 has two end positions, the lowermost position of which is reached when the aforementioned ball housing 38 bearing on the upper end of the sleeve 81 has pushed down the latter, as shown in Fig. 3. The other end position is reached when shoulder 37 of the mandrel bearing against the lower face of the head 80 has raised the sleeve into the position of Fig. 10. These two end positions are yieldably ensured by a detent pin 82 which is urged by a spring 83 against a lateral cam-like projection 84 of the lever 75. Both the pin 82 and spring 83 are located between the arms 75 in a boring 85 of the body 10. A connecting rod 86 is linked to lever arms 75 at 84' and engages with its lower end the shorter arm 87 of a bell crank lever 88 which is pivoted at 89. Springs 90 and 91 may be provided on rod 86 in order to make its connection with lever arm 87 resiliently yieldable. The other arm 92 of bell crank lever 88 carries a pin 93 which engages in a vertical elongated hole 94 of the carriage extension 53. Thus, it will be clear that if the mandrel is raised and its shoulder 37 engages the sleeve head 80, lever 75 will be raised too and carriage 52 will be projected. On the other hand, when towards a downward movement of the mandrel the housing 38 comes to bear on the upper end of the sleeve 81, the lever 75 will be lowered and thereby carriage 52 will be retracted into the position of Fig. 3.

Cover plates 95 and 96 may be provided, as shown in Figs. 1, 2 and 4 and the cover plates may be secured to the body 10 by pins 97 and 98 and screws such as 99. Furthermore, body 10 may be provided with a recess 110 and bores 111 in its rear face whereby the described assembly may be secured to a stationary pillar or the like, not shown.

The device operates in the following manner: While according to Fig. 10 the mandrel 30 is in the retracted, that means, in its uppermost position, carriage 52 is protracted so that the insert coil 100 within the carriage bore 54 is in registry with the mandrel. When now the latter is urged down by a press, not shown, from the side of the connecting member 42, the lower end portion 33 will enter the insert 100 and push the latter downwards into the nozzle 23, 24. During this movement, the mandrel is turned by the engagement of pin 43 moving in the groove 44. The pressure of the nozzle piece 24 under the action of the spring 26 will prevent the rotation of the insert within the nozzle so that the step 35 can engage the upper end of the insert which may now rotate with the mandrel until the pin 43 has reached the funnel portion 45 at the end of groove 44. Towards the end of the downward movement of the mandrel which then pushes the insert out of the nozzle and into the bore of the work piece W, ball housing 38 on sleeve 81 will shift the latter downwards. Thereby lever 75 is taken along and pushes connecting rod 86 and bell crank lever arm 87 also downwards. In consequence, lever arm 92 will be turned counter-clockwise and will retract the carriage 59. This is possible owing to the opening 55 which clears the mandrel portion 32. The rearward motion of the carriage allows lever arm 72 to slide off the carriage extension face 74 so that arm 66 will bear against insert 102 located above the insert 101 which, for the time being, bears on top of the carriage 52. When the carriage is fully retracted against the abutment screw 62, the carriage opening 54 will be in registry with the chute sleeve 49 so that now the insert 101 can drop into the carriage opening 54 into the position shown in Fig. 3 for the preceding insert 100.

When the insert has been installed, the mandrel will be raised whereby pin 43 will be conducted through the funnel 45 along one of the edges of the tapered sleeve end 45' into the groove 44. When the mandrel shoulder 37 reaches the sleeve head 80, the sleeve 81 will be raised to the position of Fig. 10. In consequence, lever arms 75 will be taken along to turn, through connecting rod 86, bell crank lever 88 in clockwise direction thereby shifting the carriage 52 with the insert in its bore 54 against the T-shaped plug 56 into the position of Fig. 3. During this movement, as explained hereinbefore, lever 64 will be turned in counterclockwise direction thereby permitting the stock of inserts in the chute 46, 49 to slide down so that the lowermost insert bears on top of the carriage 52. Thus, the position of the parts shown in Fig. 10 is reached again so that a new cycle of operation may start.

In the embodiment hereinbefore described, the mandrel is positively rotated in one direction throughout the length of its displacement so that an engagement of the step of the helical mandrel shoulder with the ultimate upper end of the insert is permanently insured. This rotation occurs in a direction tending to expand the insert which is more or less frictionally restrained during the insertion in the bore of the boss. There are instances where such expansion is objectionable particularly if the insert is originally wound with a diameter slightly larger than that of the mentioned bore, in order to cause the insert to press springingly against the wall of the bore after the insertion. In such cases it is desirable to contract the insert beginning at least at the point where the insert first starts to engage the bore of the boss or, in other words, where the insert starts to leave the nozzle. Figs. 15 to 18 illustrate a modification of the scroll groove in the guiding sleeve of the mandrel, whereby the desired result is obtained. According to this modification, the mandrel is positively so rotated during the first and major portion of its downward displacement that the engagement of mandrel shoulder step 35 and insert end 100' is secured, as shown in Fig. 17. From the point on, however, where the lower insert end leaves the nozzle 23, 24, i.e. when the insert first engages the bore of the boss W, the rotation of the mandrel is positively reversed. For this purpose, sleeve 116 located in and secured to the tubular member 15 in the same manner as sleeve 16 in Figs. 3 and 10, is provided with a scroll groove in general denoted by 144. In its upper portion 144' the groove turns in the same direction as the insert. In consequence, mandrel 31 engaging this groove portion with its pin 43 will be positively rotated to cause the engagement of the shoulder step and the upper insert end, the same as hereinbefore described. Beginning at point 150, however, the direction of the turn of the groove 144 is reversed in its lower portion 144''. This point 150 is so located that it will be reached by pin 143 substantially at the time when the lower end of the insert, engaged by the mandrel, will have reached the lower end of the nozzle 23, 24. When now the insert being further advanced by the mandrel movement is about to enter the bore in the boss W, the lower end of the insert will encounter some resistance. On the other end of the insert the mandrel will exercise a downward pressure while simultaneously turning in a direction opposite to that in which the insert is wound. In consequence, a torque will be set up frictionally tending to contract the insert and thus to facilitate the entering of the insert into the boss. Thereby it may happen that the step 35 slides back from the insert end 100' as shown in Fig. 15. However, this is not necessarily so and the step may still remain in engagement with the insert end.

It will be noticed that in the lower groove portion the lower edge 145 is the one which guides the pin 143 and thus turns the mandrel on its downward movement. During the return stroke of the mandrel the opposite groove edge 146 will be guiding. If now the width of the groove portion 144'' were constant, it might happen that when the return stroke starts, the mandrel step 35 still bearing against the insert end tends to expand the insert already located within the bore of the boss, and the resulting forces may then become so strong that something would have to give. Means are provided to prevent such happening. For this purpose, the lowermost portion 147 of the groove 144 is widened approximately pear-shaped. In consequence, the pin 43 having reached the lowest point, indicated by 143 in Fig. 15, can be freely raised a short distance before engaging the groove edge 146, that means, before it is positively guided to turn in the direction the groove portion 144' turns the mandrel during the first part of its downward stroke. This freedom of the pin 143 in the groove portion 147 allows for a vertical withdrawal of the mandrel step from the engaged insert end without any rotation. When then the pin 43 engages the edge 146 further axial displacement of the mandrel will cause a simultaneous turning of the mandrel back to its initial position.

All other parts of the device employing the modification of Figs. 15 to 18 may be of the same or similar design as those of the embodiment first described and illustrated in Figs. 1 to 14.

It will be apparent to those skilled in the art that many alterations and modifications of the structure illustrated and described may be made without departure from the spirit and essence of the invention which for that reason shall not be limited but by the scope of the appended claims.

I claim:

1. In a device for installing a wire coil screw thread insert in the cylindrical bore of a work piece, the combination of a tubular member, a mandrel guided in said tubular member, a thrust bearing being disposed on top of said mandrel to permit simultaneous rotation of said mandrel when an axial movement is imparted to said mandrel through said thrust bearing, said mandrel having a helical shoulder forming a step at a short distance from its lowermost end, said tubular member forming a lower nozzle-like end portion and being provided with a lateral recess above said nozzle-like end for charging an insert in the path of said mandrel, said mandrel being reciprocal between an upper end position in which said mandrel is clear of the recessed tubular member portion, and a lower end position in which said helical shoulder has pushed a charged insert through and out of said nozzle-like end, one of said mandrel and said tubular member being provided with a scroll-like guiding face, and a pin being secured to the other one of said mandrel and said tubular member and adapted to engage said scroll-like face so as to rotate said mandrel positively in the direction of the insert winding in the course of its active downward stroke, whereby the mandrel will be turned so as to engage the top end of the charged insert with said shoulder, the one of said mandrel and said tubular member provided with said scroll-like guiding face is also provided with another guiding face engageable by said pin to rotate said mandrel in the opposite direction in the course of its return stroke, said pin being disengaged from both said scroll-like faces over an initial short distance of the return stroke of said mandrel.

2. In a device for installing a wire coil screw thread insert in the cylindrical bore of a work piece, the combination of a tubular member, a mandrel guided in said tubular member, a thrust bearing being disposed on top of said mandrel to permit simultaneous rotation of said mandrel when an axial movement is imparted to said mandrel through said thrust bearing, said mandrel having a helical shoulder forming a step at a short distance from its lowermost end, said tubular member forming a lower nozzle-like end portion and being provided with a lateral recess above said nozzle-like end for charging an insert in the path of said mandrel, said mandrel being reciprocal between an upper end position in which said mandrel is clear of the recessed tubular member portion, and a lower end position in which said helical shoulder has pushed a charged insert through said nozzle-like end, one of said mandrel and said tubular member being provided with a scroll-like guiding groove, and a pin being secured to the other one of said mandrel and said tubular member and adapted to engage said groove so as to rotate said mandrel positively in the direction of the insert winding during a portion of its axial stroke and to allow free rotation during the lower end portion of its stroke, whereby the mandrel will be turned so as to engage the top end of the charged insert with said shoulder and will, during the end portion of its downward stroke, follow any tendency of said insert to turn said mandrel in the opposite direction.

3. A device as in claim 2, said nozzle being lengthwise divided, one part of said nozzle being rigidly connected with said tubular member and the other part being movable radially in relation to said first part, said device further comprising a resilient means urging said second part towards said first part.

4. A device as in claim 2, said scroll-like groove turning in the direction of the winding of the insert for which the tool is destined, and ending approximately reversed funnel-like in an inner circumferential clearance.

5. A device as in claim 2, said thrust bearing comprising a ball located on the upper end of said mandrel and being adapted to transmit pushing forces while allowing said mandrel to turn, and a housing enclosing said ball and holding said upper mandrel end axially non-shiftable in relation to said housing, said housing being adapted to be connected to a power drive for reciprocating said mandrel in the axial direction.

6. A device as in claim 2, said groove turning in its upper portion in the direction of the winding of said insert and in its lower portion in the opposite direction.

7. A device as in claim 2 wherein the extension of said groove in the axial direction is shorter than the stroke of the mandrel, said groove having a lower end widened substantially in a pear-shaped recess, the material thickness in which said pear-shaped recess is formed being tapered and ending in a point located on a higher level than that of said pin when the mandrel is in its lower end position, the flanks of said pointed end being continued by the flanks, respectively, of said groove.

References Cited in the file of this patent

UNITED STATES PATENTS

| 528,731 | Morrison | Nov. 6, 1894 |
| 654,150 | Hanna | July 24, 1900 |
| 2,839,823 | Brancato | June 24, 1958 |
| 2,840,892 | Erdmann | July 1, 1958 |